Figure 10:
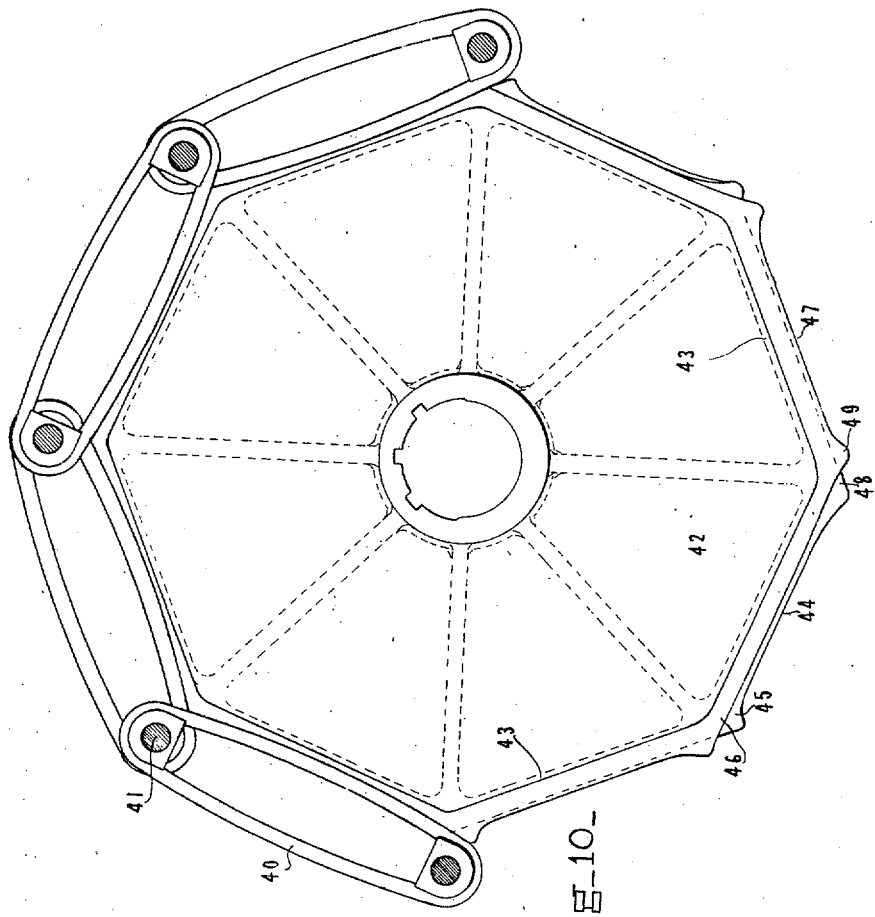

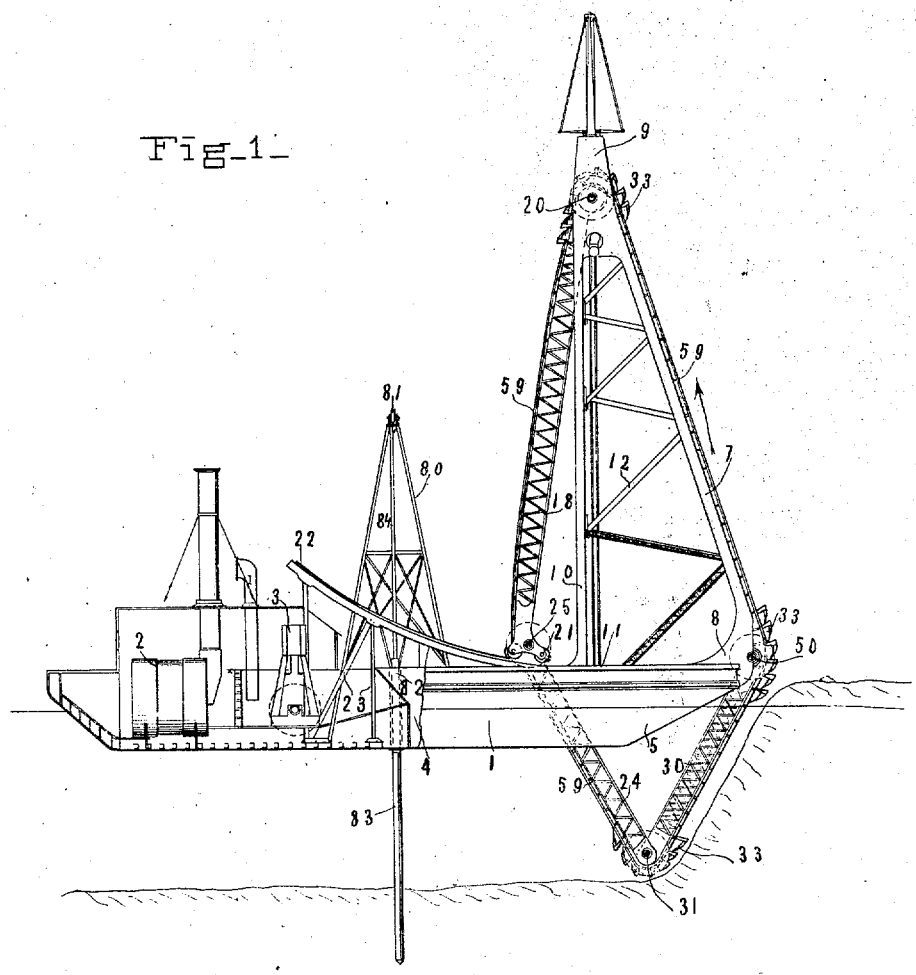

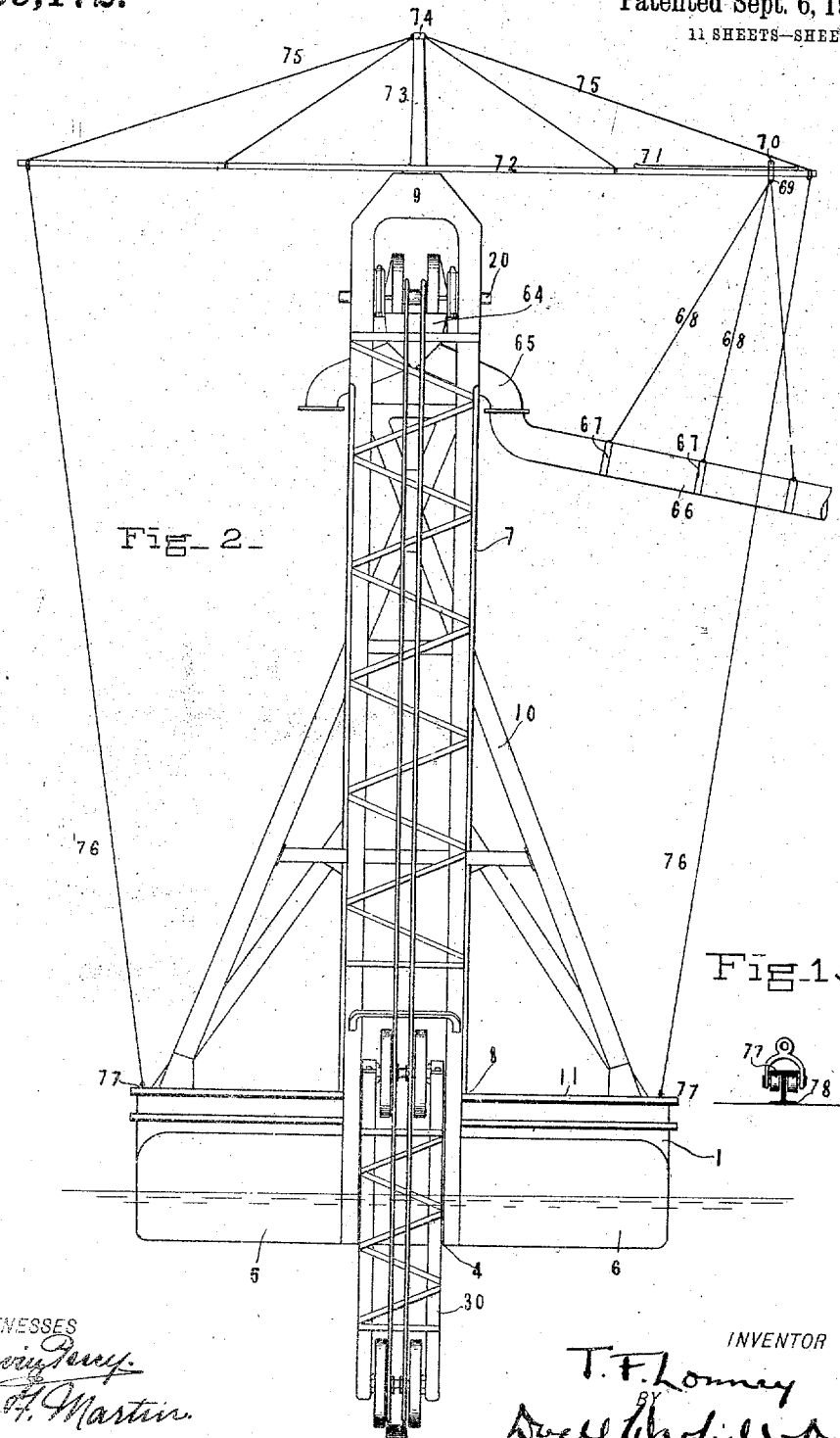

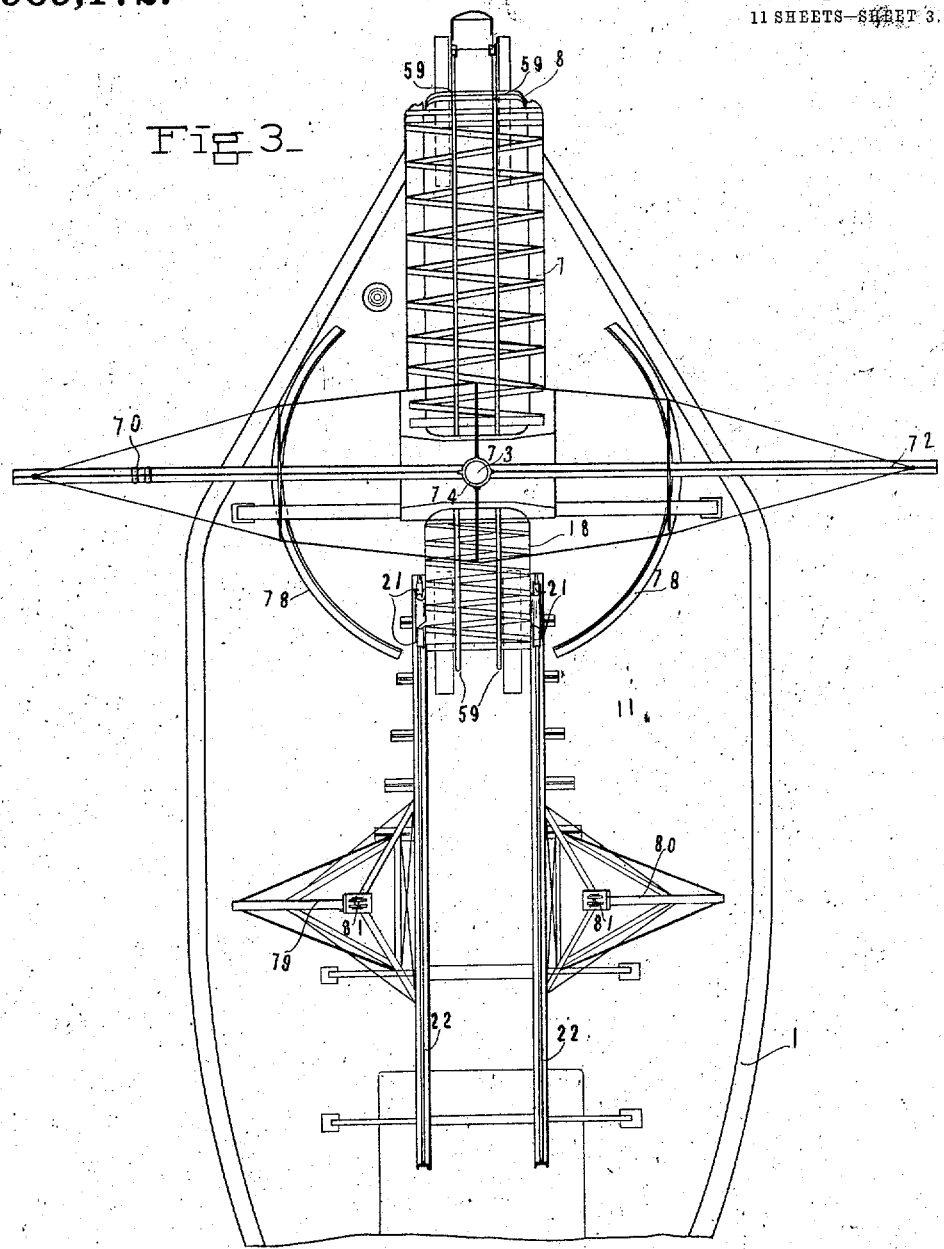

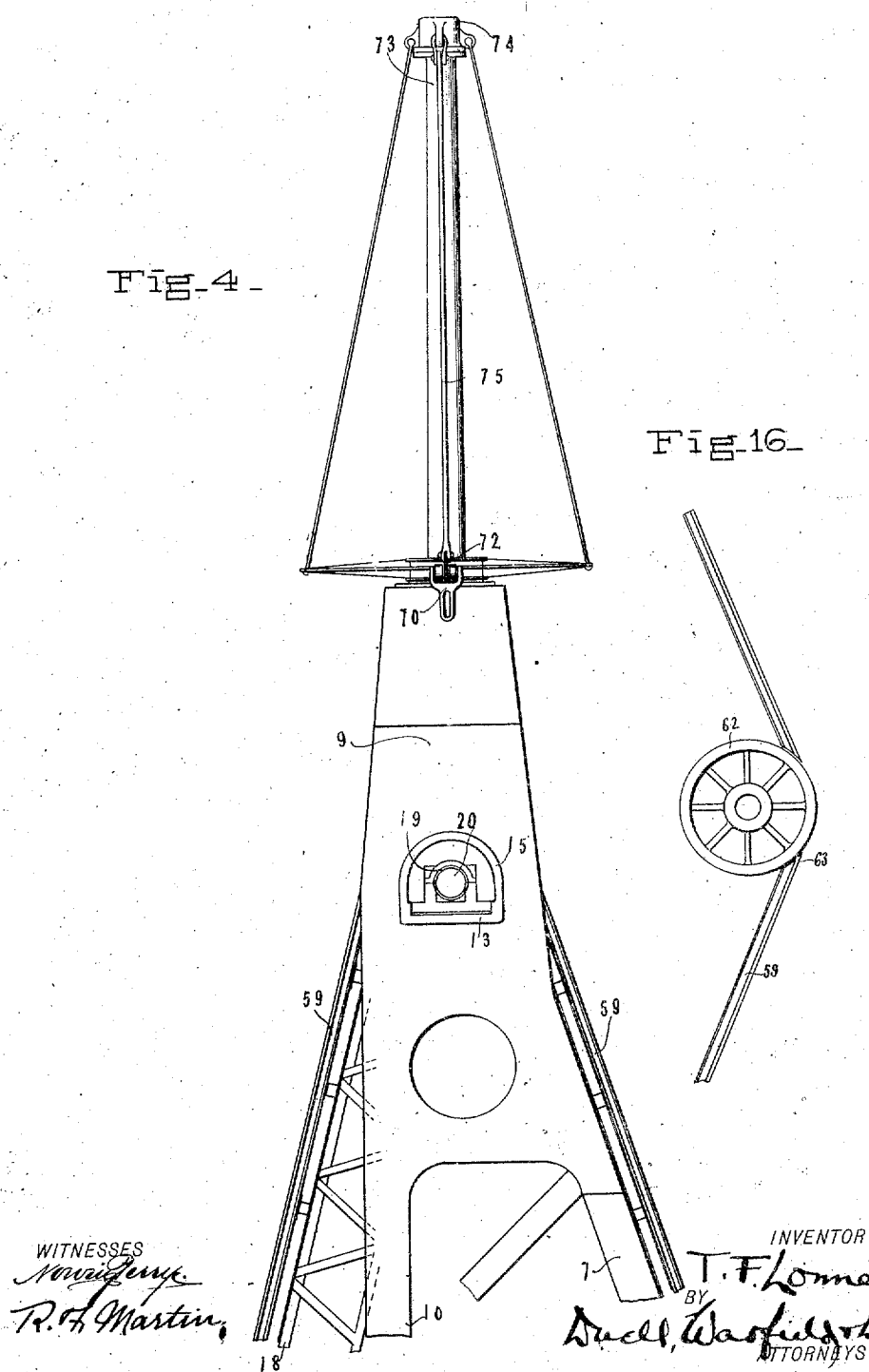

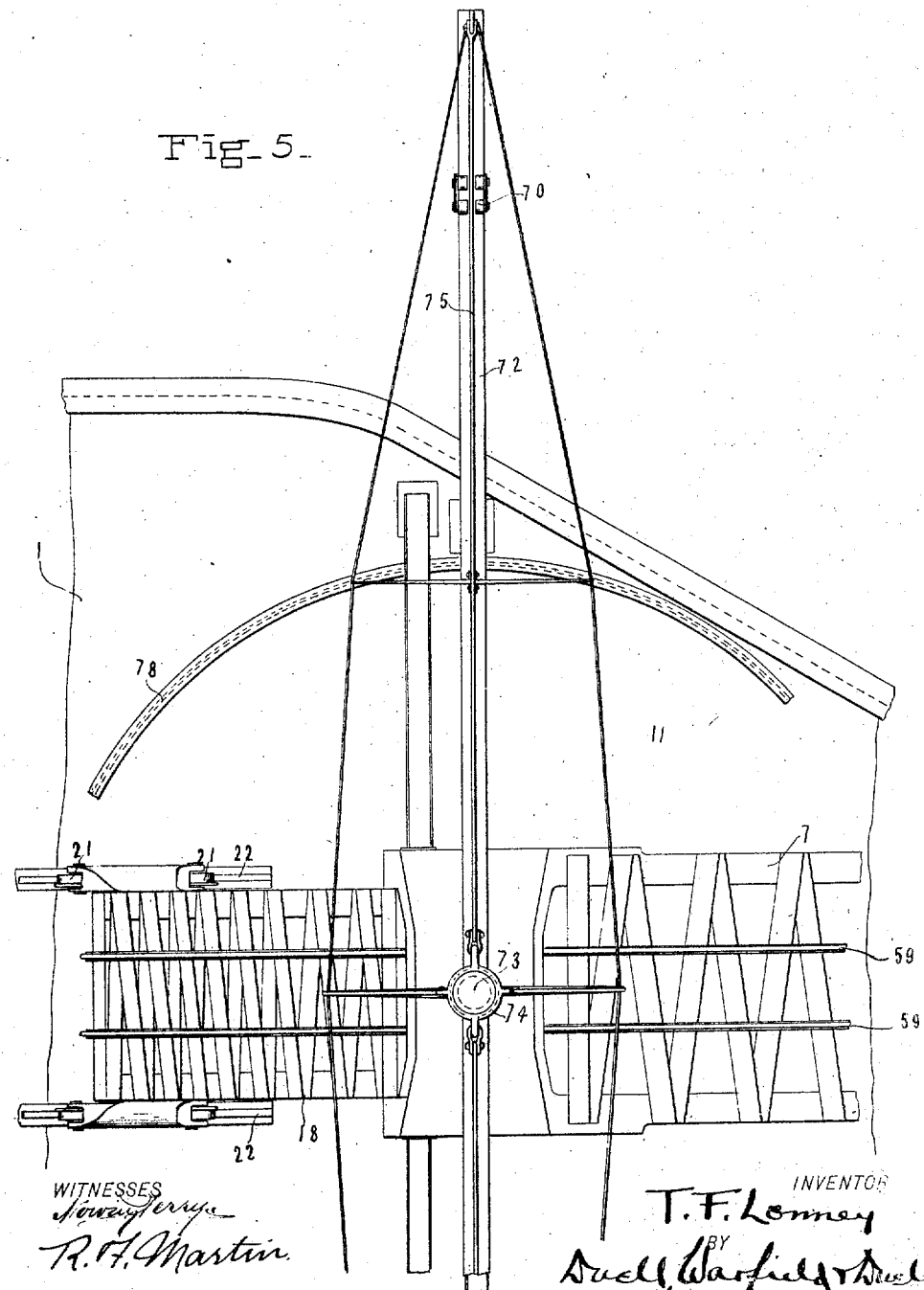

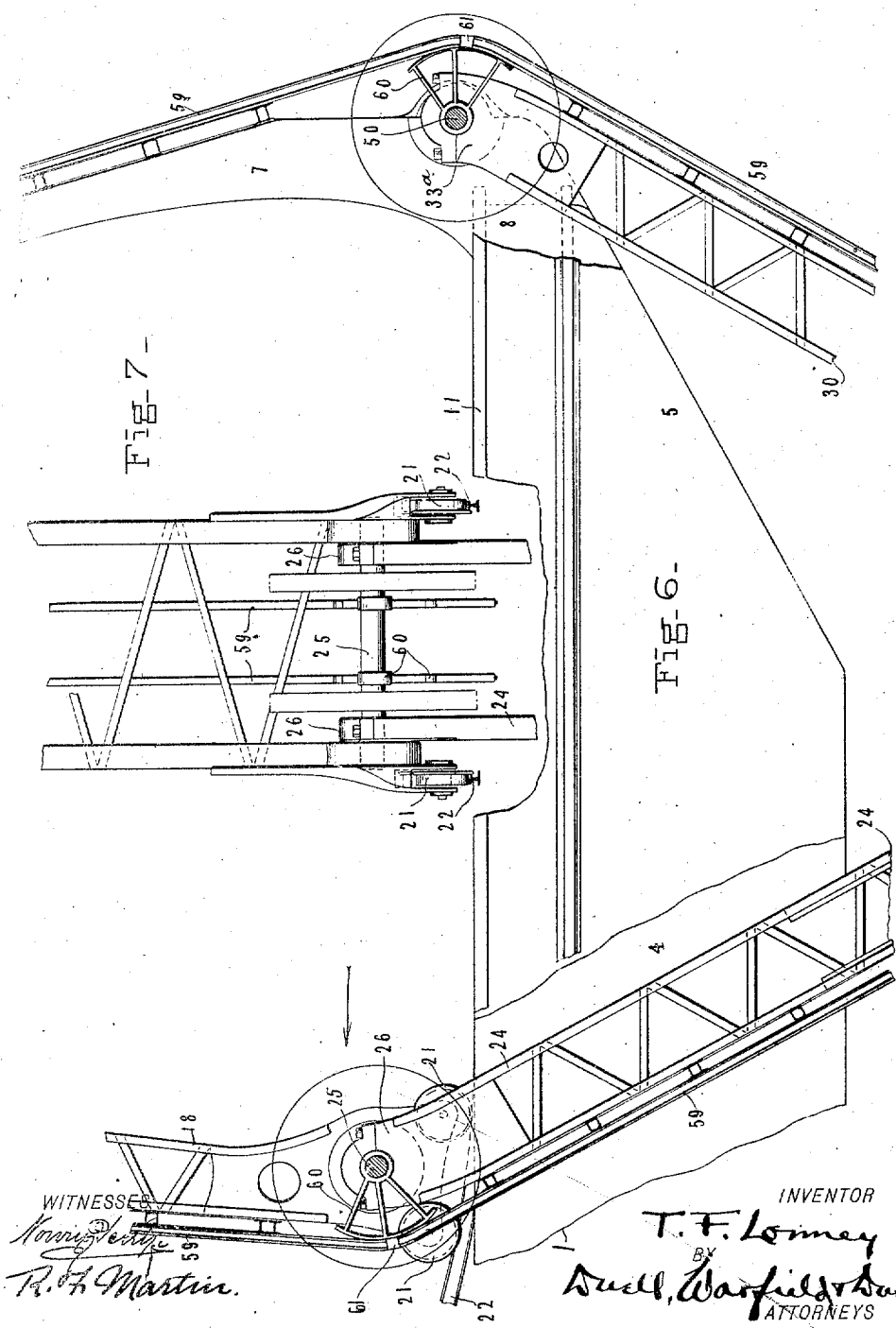

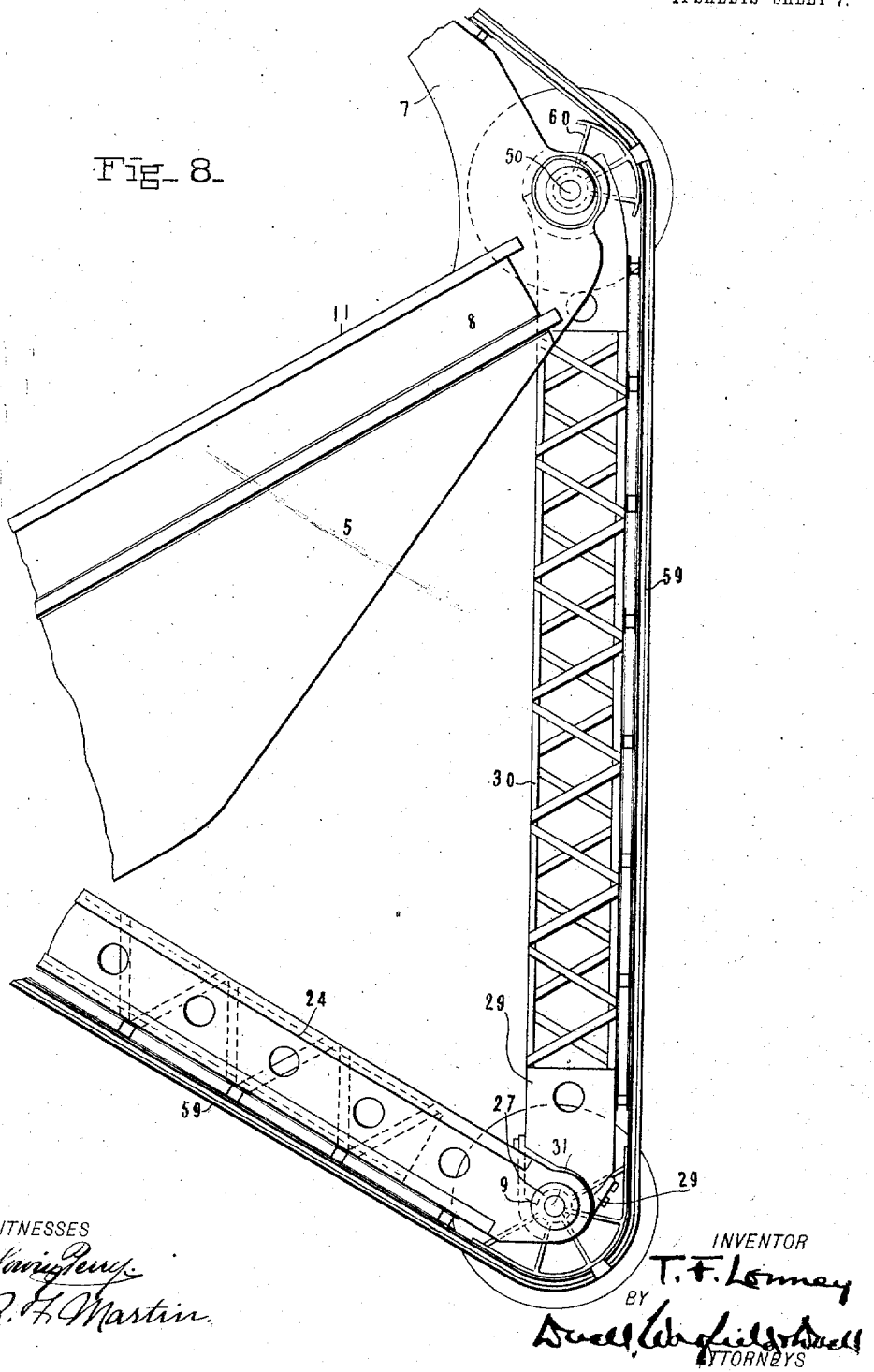

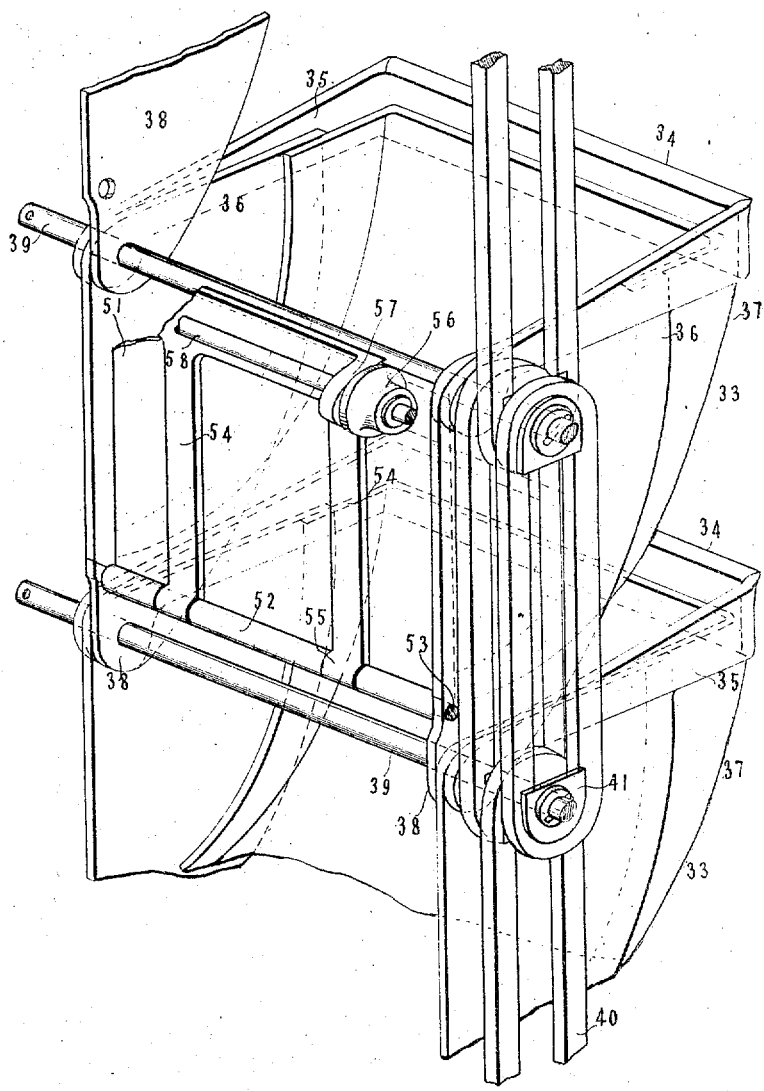

T. F. LONNEY.
EXCAVATING MACHINE.
APPLICATION FILED NOV. 10, 1906. RENEWED JUNE 29, 1910.

969,172.

Patented Sept. 6, 1910.
11 SHEETS—SHEET 9.

WITNESSES

INVENTOR
T. F. Lonney
BY
Duell, Warfield & Duell
ATTORNEYS

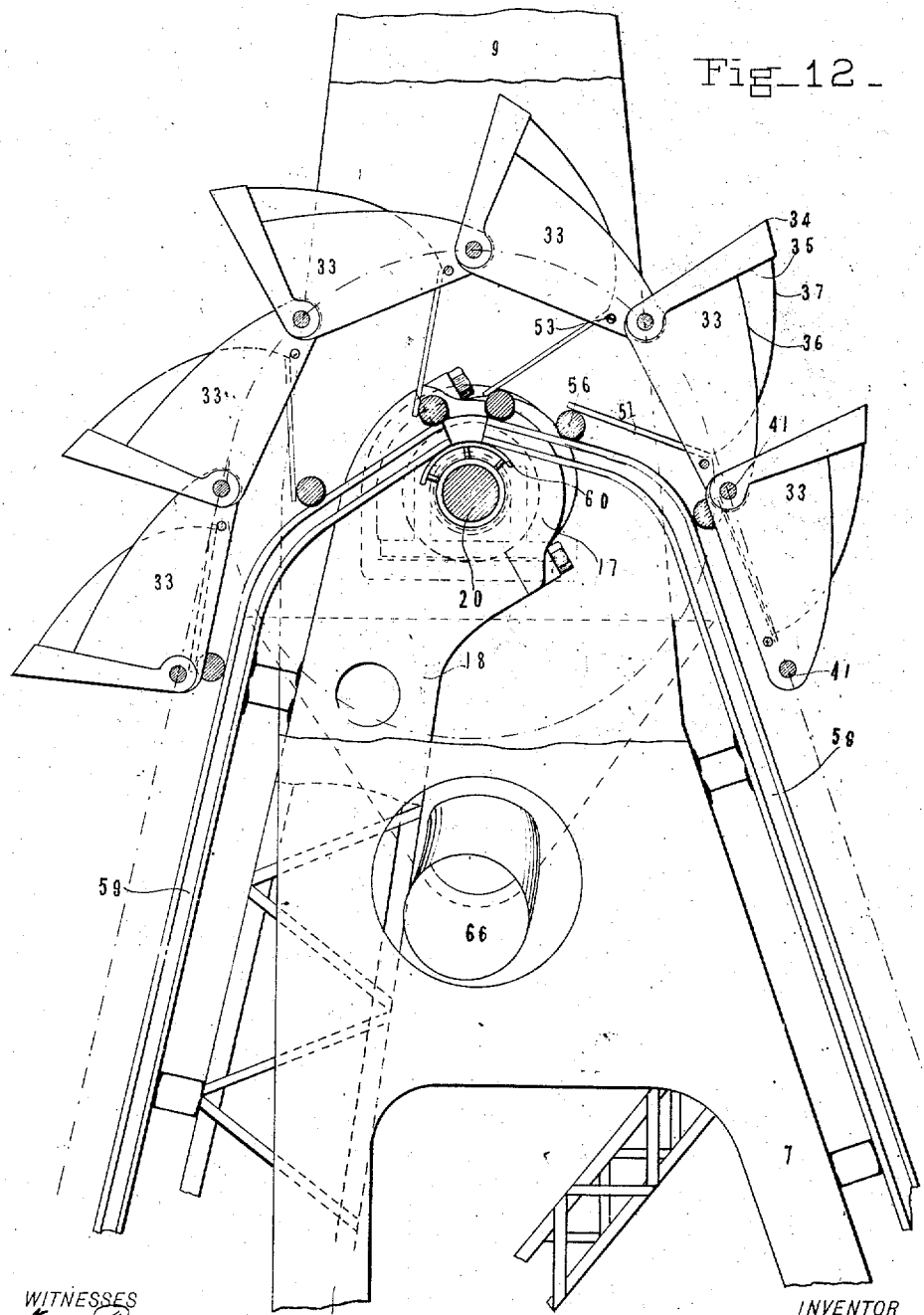

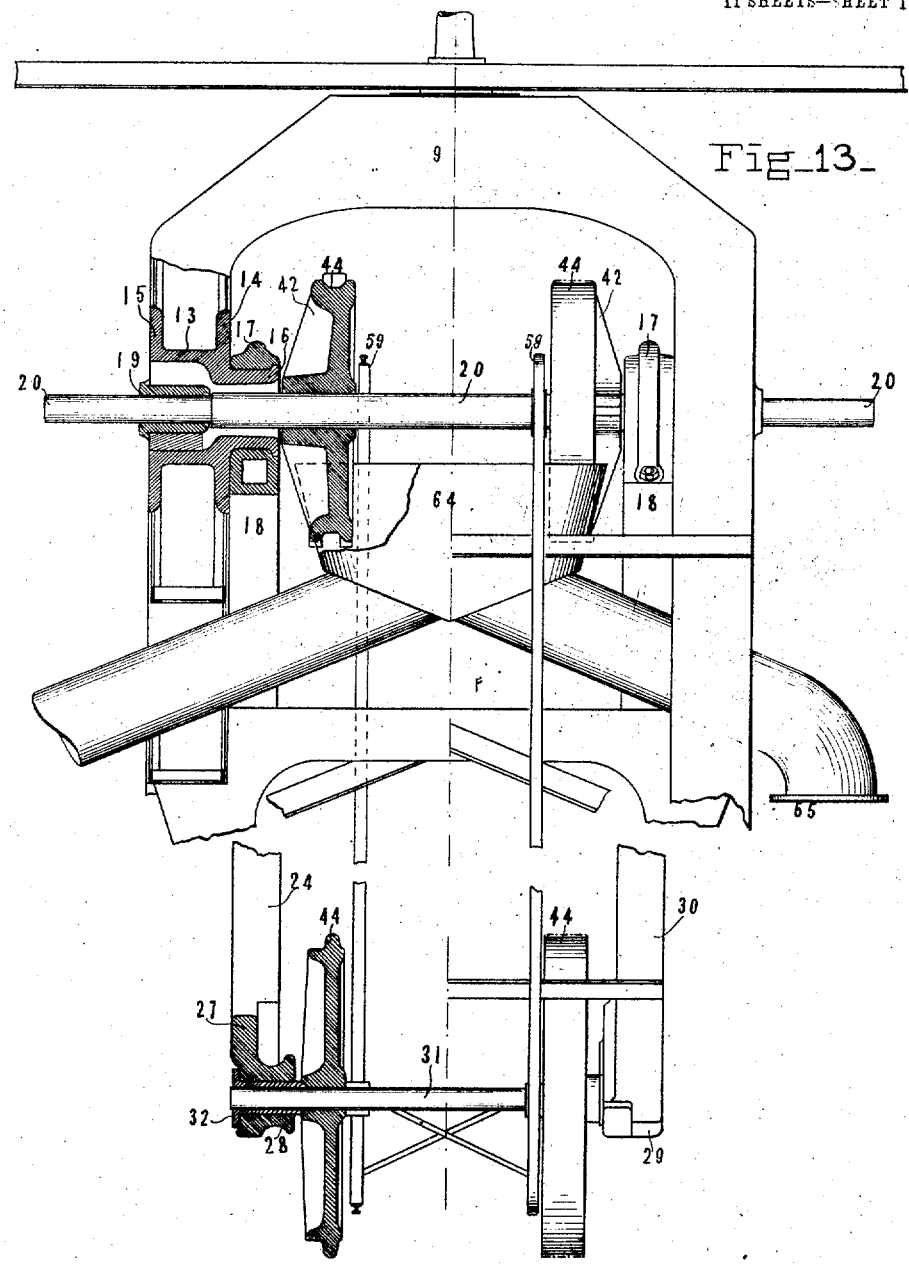

UNITED STATES PATENT OFFICE.

THOMAS F. LONNEY, OF BROOKLYN, NEW YORK, ASSIGNOR TO GEORGE UPINGTON, OF BROOKLYN, NEW YORK.

EXCAVATING-MACHINE.

969,172.   Specification of Letters Patent.   Patented Sept. 6, 1910.

Application filed November 10, 1906, Serial No. 342,782. Renewed June 29, 1910. Serial No. 569,581.

*To all whom it may concern:*

Be it known that I, THOMAS F. LONNEY, residing at Brooklyn, in the county of Kings and State of New York, have invented certain new and useful Improvements in Excavating-Machines, of which the following is a full, clear, and exact description, such as will enable others skilled in the art to which it appertains to make and use the same.

This invention broadly relates to means for excavating material, but since certain of its characteristic advantages prominently appear when it is resorted to for the purpose of enlarging or constructing new waterways, it will be conducive to clearness to describe an embodiment especially adapted for such use.

One object of this invention is to provide a means of the class described which will excavate material in advance of the excavating apparatus, so that the latter may continuously advance and cut its own channel.

Another object is to provide an excavating apparatus which operates by means of an endless chain of buckets and in which the slope of the cutting line may be arranged to conform to various positions without necessitating a variance in the length of the endless chain of buckets.

Another object is to devise an excavating apparatus in which the cutting may take place along a runway rising to the beak of the boat, and in which such runway may be given any desired slant, so that the buckets may gather material continuously throughout their length of travel along such runway, and so that the material may be gathered from the superficial submerged surface of the bank and therefore be of a relatively soft nature.

Another object of this invention is to devise an apparatus of the class described which will gather the material to be excavated in such a way that it will be loosely retained in the scoop and thus be in a condition admitting of a ready discharge from the buckets without imposing undue shock or strain upon the apparatus.

Another object is to provide an excavating device of the described nature with means whereby it may be maintained in a given position and be capable of being swung about a center post to cut channels of various widths.

Another object is to devise an excavator which provides means for progressively advancing the whole against the bank, simultaneously with a side to side oscillation of the cutting line.

Another object is to provide an excavator which from an operative standpoint will, in usage, possess a high degree of efficiency and effectiveness, and which, structurally considered, will be of the greatest possible simplicity, being composed of but few parts, all adapted for being made at a minimum of cost and individually so formed as to be capable of being readily assembled into a compact and highly mechanical arrangement for accomplishing the purposes intended.

Other objects and advantages will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In order that this invention may be more fully understood and made comprehensible to others skilled in its relating arts, drawings illustrating a practical manner of carrying out the same are appended as a part of this specification, and, while the controlling principles of the invention may be otherwise applied by modifications falling within the scope of the claims, the herein disclosed embodiment is that which will ordinarily be preferred in practice and is regarded as representing substantial improvements over the many obvious and implied variations of the same.

In such drawings like numerals refer to corresponding parts throughout all the figures, of which—

Figure 11:
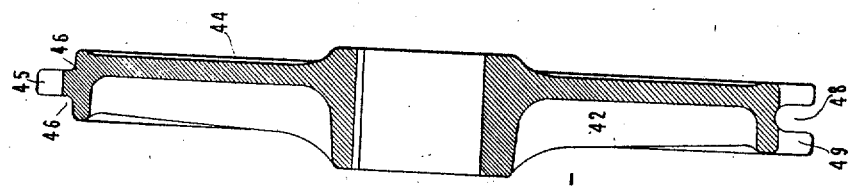

Figure 1 is a side elevation showing the excavator in operation, a side of the boat being cut away to give a diagrammatic representation of the mounting of the engine and boilers relatively to the collapsible excavating framework and also showing a steady pile anchored to the bottom of the waterway; Fig. 2 is an end elevation looking toward the front of the apparatus and illustrating certain details not apparent from the preceding figure; Fig. 3 is a top plan view showing the general arrangement of the parts of this apparatus and their mountings upon the float or vehicle supporting the same; Fig. 4 is a fragmentary elevation on an enlarged scale to show in detail the top brace or crane which serves to position and carry the discharge chute, together with the various features incidental to the same; Fig. 5 is an enlarged fragmentary view in elevation, showing the apex of the excavating framework and the mounting of the top brace or crane carried at the summit thereof; Fig. 6 is an enlarged elevation showing details of the intermediate joints and the arrangement of the corresponding parts of the runway; Fig. 7 is an elevation of the movable intermediate joint looking at the same from the inside, i. e., in the direction of the arrow shown on Fig. 6; Fig. 8 is a side elevation of the toe of the apparatus and the forward fixed intermediate joint, illustrating the general arrangement and construction of the shown parts; Fig. 9 is a sectional perspective, showing the construction and arrangement of the buckets constituting units of the endless excavating chain; Fig. 10 is a side elevation of one of the turning wheels which is mounted at each hinge of the collapsible framework to carry the endless excavating chain; Fig. 11 is a vertical section of the wheel illustrated in Fig. 10; Fig. 12 is a sectional elevation of the apex of the excavator, showing the manner in which the swinging doors are opened to discharge the contents of the buckets rounding such apex; Fig. 13 is a sectional elevation taken along an axial plane through Fig. 12 to illustrate certain features not clearly apparent from the aforesaid figure; Fig. 14 is a sectional elevation through the toe of the excavating apparatus and showing the arrangement of certain parts not clearly set forth in the preceding figures; Fig. 15 is a sectional view of an arc-shaped runway on the deck of the boat to which the lower end of the stay for the upper crane is slidably affixed; and Fig. 16 shows a modification of the flexible turning joint of the auxiliary track for controlling the discharge doors of the excavating buckets.

Preliminary to a detailed structural consideration of the foregoing illustrated embodiments of this invention, it may be pointed out that the opening up of new waterways is, from a practical standpoint, attended with certain peculiar difficulties, particularly when the excavating is done through the instrumentality of an endless series of buckets.

The practice heretofore has been to cause the bucket to be compactly filled at the start or when in its lowermost position. Upon then raising the initially filled bucket it will usually contact with additional matter, which, while incapable of being col-lected in the already full bucket, will however tend to further compact the material already gathered therein and thereby render the discharge of the bucket difficult, especially when such material is of a sticky and adhesive nature, such as clay. In accordance with the herein described invention, I propose to adjust the slant of the cutting line of the rising excavating chain to conform with the natural slope of the bank undergoing excavation. As a result, such bank will not tend to slip or collapse during the excavation, and its submerged superficial surface will present uniform conditions to the excavating buckets. The latter will then be so brought against the bank that their cutting edges will extend into the bank for a relatively short distance only, and the amount of material accumulated in the buckets will be due rather to the length than to the depth of cut. As a consequence, but slight strains will be imposed upon each bucket, and the wear on the same will be correspondingly greatly decreased. Furthermore, when collected in this way the contents of the buckets will be found to be soft and soggy, because taken from the superficial submerged face of the bank, as contrasted with the compact and relatively dry state of former practices. Because of this peculiar condition, the discharging or dumping of the buckets is greatly facilitated, the material flowing from the bucket without shock and, because of its mushy condition, being well adapted for being subsequently conveyed to a distant point through a suitable chute. Again, in digging a new canal or in enlarging a preëxisting waterway, the excavator must cut its own way, and this involves many practical problems. The excavating should take place progressively and as rapidly as possible, and a positive central anchorage should be insured. Moreover, the cutting portions of the excavator should be so arranged and positioned that other parts of the apparatus will not interfere with a perfect action thereof.

Turning now to the drawings, 1 denotes the boat which carries the various parts of the excavator proper. As the latter will ordinarily be mounted upon the bow of the boat, I propose to balance the whole by mounting the boiler 2, engine 3 and other parts at the opposite end or stern of the boat. In practice the latter portion may also be utilized for the storage of coal and other supplies, and the quarters of the crew may be also arranged so as to equalize the balance of the whole. The bow of the boat, as shown, is provided with a well 4 through which the depending portions of the excavator pass, and to this end such bow may be bifurcated so as to provide right and left hand supports 5 and 6 carrying corresponding parts of the excavator. As will be obvious, variations in this particular may be resorted to, and the length of the well may be only sufficient to provide for the play of the rearward depending truss of the excavator.

The excavator framework may be considered as consisting of two main parts, one stationary and in fixed relation to the float, and the other hinged to the stationary part and movable with relation to the float so as to vary the depth and slope of cut of the apparatus. The stationary frame may be built up of steel or other suitable material, and may provide a forward truss 7 which rises from the beak 8 of the boat and slants upwardly toward its summit 9. A brace truss 10 may extend from the deck 11 of the boat and connect with such summit to stiffen truss 7 and cross pieces 12 may also be provided if desired. The stationary frame is provided in its upper end or apex with an aperture within which is seated a pillow block 13, see Fig. 13, which may be of cast iron, steel or other suitable material. This pillow block, as shown, is of a somewhat peculiar shape, and comprises two annular flanges 14 and 15, which are spaced apart and secured to the steel or sheet metal work frame in the manner shown. The pillow block is also centrally apertured, and extends inwardly to form an annular bearing 16 which serves as a pivot for the hinge 17 of the upper movable truss 18. Suitably carried by the pillow block is a brass 19, which may be of any preferred construction, and within which is revolubly mounted the journaled end of a shaft 20 which transversely extends through the two sides of the stationary framework and preferably protrudes on one or both sides thereof to make provision for carrying an upper wheel or other means for driving the endless excavating belt.

The truss 18 extends from its upper pivot as aforesaid to the deck of the boat and is arranged to swing about its upper end as a center. While it may be entirely supported from its upper pivot, I prefer to provide roller bearings at its lower end so that the strains may be more evenly distributed and excess weight taken from the upper pivot, and to that end I have mounted flanged wheels 21 on the lower end of said truss. These wheels ride along segmental tracks 22, as will be seen by referring to Figs. 1, 6 and 7. Such tracks may be mounted in any desired manner upon the boat, and they may be positioned by means of the shown braces 23 or otherwise as may prove to be most expedient in practice. The segmental tracks are curved to correspond with the upper hinge of the swinging truss as a center, and accordingly the lower end of said truss will be always supported however it be swung about such center.

The depending truss 24 may be hinged to the swinging truss 18 by means of pillow blocks in the same way that the swinging truss is pivoted at its apex to the stationary frame, or I may mount a transverse shaft 25 with its ends journaled to the swinging truss as shown by Figs. 6 and 7. The depending truss 24 may be arranged to swing about shaft 25 as a pivot, and may be provided at its hinged end with a suitable bearing 26 which fits about said shaft.

The construction of the lower end of said depending truss and the manner of connecting it to its companion to form a movable toe, may be best understood by referring to Figs. 8 and 14, from which it will be seen that truss 24 is also provided with a bearing-piece or pillow block 27, which, like the pillow block at the apex, is apertured and is provided with an inner extension 28 adapted to serve as a pivot for the pillow block 29 of the companion truss 30. This arrangement relieves the shaft 31 of undue binding and enables the latter to freely revolve about its bearing 32. The forward depending truss 30 is also hinged at the beak of the boat by means of a pillow block 33ª to the stationary rising frame 7.

It will now be understood that the three links 18, 24 and 30 may be moved into different positions, which will be determinable by the location of the rear intermediate hinge of the structure. This moving may be done through any suitable instrumentality, as for example a worm gearing may be driven by the engine 3 whenever desired, so as to displace the said joint into any suitable position. Or I may provide winding drums which receive cables secured either to the movable intermediate joint or to the toe of the apparatus, as may be preferred.

The excavating is preferably done by means of an endless series of buckets or scoops 33 which are connected together at intervals and carried by an endless belt or chain, as shown more clearly by Figs. 1, 9 and 12. When such endless belt is caused to travel around the supporting framework, the buckets will in rotation be brought against the silt or other material which will thus be continuously removed. It will be noted that in the shown embodiment the cutting edge 34 of each bucket constitutes the outermost portion of the same and that, practically speaking, it is only this portion of each bucket that comes in contact with the material to be excavated. One of the important improvements contemplated by this invention resides in making the cutting edges of the buckets of great strength and of material which is hard and durable. To that end, the cutting edge forms the extreme portion of a strap 35 which is substantially of a U-shaped contour and is preferably so formed as to slant upwardly toward its outermost cutting edge, which is sharpened or otherwise brought into a shape adapted to cut into the material to be excavated. This strap will preferably be reinforced by means of side plates 36, which may also constitute the sides of the bucket. Ordinarily these plates will be of less thickness than the cutting portion, and such plates may either be integral with the cutting or body portion or they may be separate therefrom and riveted or otherwise securely affixed thereto. Inasmuch as the cutting portion is in usage subjected to much abrasion, and will in some cases become soon worn away, this portion may be so arranged as to permit of being conveniently replaced from time to time. The outer wall or body portion 37 of the bucket may ordinarily be formed of a cheaper grade of material than the wearing parts, and to that end may be of sheet iron or other suitable inexpensive material. This portion of the bucket may be dished in the manner shown, to form a flat outer curved surface with transverse integral sides, which will extend so as to be overlapped by both the cutting lip and the reinforcing side wall. This dished piece may then be riveted or otherwise secured to the lip and to the reinforcing side wall, as will be readily understood.

This invention also proposes to so fashion and arrange the buckets that each will constitute a unit of an endless excavating chain, and to that end, and inasmuch as it is desirable to dispense with all unnecessary parts, the buckets are secured together through extensions 38 of the reinforcing side walls. The extensions from such walls are ogeed and terminate within the succeeding companion bucket. The attachment follows through a shaft 39 which transversely passes through alined apertures in the cutting lip, the underlying reinforcing side wall and the extension from the side wall of the overlying bucket respectively. The construction of each side wall of the bucket is in this respect identical. Although the buckets are by this arrangement all firmly secured together, and are at the same time capable of being readily replaced for the substitution of fresh buckets, it is advisable to provide means for further reinforcing and driving this endless system. To this end this invention proposes to extend the transverse shafts 39 so that they will protrude slightly beyond the sides of the buckets. These shafts are secured to and joined together by means of a chain, which preferably is built up of an alternating series of overlapping single and duplex links 40; that is to say, embracing two of the shafts, at each end thereof will be two parallel links whose ends overlap single links which extend to the adjacent shafts, and the entire system may be built up in this way. Bearing blocks 41 are interposed between each link and its associated shaft.

A feature of practical advantage may here be noted, by referring to Fig. 10 from which it will be seen that the links 40 of the chain are spread intermediate their ends so as to permit the bearing blocks 41 to be removed when worn by merely moving them toward such spread portion which is sufficiently wide to enable such bearing blocks to be removed. Howbeit, this feature is subject to modification within the scope of this invention, and various arrangements of driving means may be resorted to, although the herein shown form possesses many characteristic advantages. An excavating linkage constructed in this way is well adapted for being driven, and carried by a cog-wheel. Such wheel 42 may be formed in accordance with Figs. 10 and 11, and comprises a periphery 43 of polygonal contour, each facet of which is provided with a suitable projection and seat for the corresponding links of the chain. Thus the one facet 44 will have a middle projection 45 with recessed seats 46 on each side thereof, the middle projection being adapted to protrude through the space betwen the two side links of the chain and engage the hinge thereof, and the side recesses being adapted to seat such links. The adjacent facet 47 will on the contrary comprise a central recess 48 for the single link of the corresponding portion of the chain, and two side projections 49 will be provided for positioning the link and engaging the hinge at each end of the link. In order that such wheel may not be unduly clogged by any dirt or other foreign matter which may be carried by the chain, I prefer to depress the projections between the ends in the manner shown, so as to allow a considerable space between the links and the underlying periphery of the wheel. It will of course be understood that in the case shown any even number of facets may be employed to form the periphery of the wheel, and the latter may be of any size and proportions desirable. These wheels 44, to facilitate the turning of the buckets are of considerable diameter, and are disposed in pairs at each hinge of the collapsible framework, being spaced apart and mounted upon shafts 20, 25, 31 and 50, as shown by Figs. 6, 7, 13 and 14. The linkage of the endless train of buckets rides over the exposed peripheries of these wheels, and the length of the train will not undergo variation when the collapsible runway expands or contracts.

One very important feature of my improved system resides in the facility with which the discharging operation may take place, and which to a large extent is due to the peculiar construction and arrangement of the bottoms or inner walls of the buckets.

This inner wall 51 is not fixed and integral with the body of the bucket, but on the contrary is hinged thereto so as to be capable of opening out at the proper time to allow the material in said bucket to escape therefrom. While some little variation in this particular is permissible within the scope of this invention, the shown arrangement is that which I regard as preferable, and consists in hinging the inner wall of the bucket to the inner bottom edge of the same. A simple construction of this hinge consists in turning the material of the outer wall along its edge so as to form a cylinder 52, within which is a suitable shaft 53. Two or more strips 54 of suitable material are provided in their ends 55 with apertures through which this shaft passes, thus constituting a hinge. These strips are preferably secured to the plate 51 which constitutes the inner wall of the bucket, and such strips preferably are also arranged to carry rollers 56 which by running along a suitable track will normally keep the inner walls of the buckets in a closed position. To readily accommodate these rollers, the strips are provided with upturned bearing blocks 57 through which a shaft 58 passes, and at each end of this shaft is mounted a roller as aforesaid, which will preferably be provided with a bearing periphery and a flange adapted to maintain it upon the track.

The means whereby the hinged doors are maintained closed during the major portion of the travel of the bucket to retain the contents, and whereby such doors are allowed to open at a predetermined station to discharge the contents, will be better understood by referring to Figs. 1, 6, 7, 8 and 12. Each of the trusses carries a section of the auxiliary track 59, which is positioned quite closely to the body of the bucket and serves as a runway for the rollers 56 of the door so that the latter will be held closed, besides affording an auxiliary support for guiding and steadying the endless train of buckets.

Each joint of the collapsible framework is provided with arc-shaped supports 60 which are preferably loosely mounted on the joint shafts 20, 25, 31 and 50 and maintained against rotation therewith by any desired means, such as an attachment to one of the track ends. The track 59 rounds over these supports and, to provide for the pivoting of the trusses, is provided with a suitable expansion joint 61 at each turning point. Such joints may be had by dividing the track so as to form mortised overlapping ends, as will be understood. Or the modification shown by Fig. 16 may be resorted to, in which 62 represents a wheel loosely carried by the joint shaft and 63 the track ends, which are arranged flush and tangential with such wheel so that the door rollers may readily ride over the wheel. At the apex of the framework the railway for the rollers of the hinged sides of the buckets is curved, and follows a path sufficiently below the upper periphery of the turning wheel to permit the lips of the buckets to open and discharge the debris, as illustrated in Fig. 12. When, therefore, the bucket approaches the apex of the frame the rollers of the flap travel along their track, which begins to diverge away from the toothed linkage, and as will be readily understood the flap then begins to open, and finally assumes a substantially vertical position so as to discharge all the material in the bucket. As the bucket then progressively continues its travel the flap will begin to close and will finally be brought into a closed state.

In order that the falling debris may be properly collected this invention proposes a funnel-shaped hopper 64 having discharge outlets 65. The outlets extend to either side of the framework, and as will be understood may be used simultaneously to spread the debris along each bank of the canal as it is being cut, or but one of these outlets may be used at a time and the debris may be spread along one of the banks, according to the preference of the operator.

To enable the debris to be discharged at a distance from the sides of the framework this invention proposes a conveyer pipe 66 which is provided with a series of collars 67 spaced apart at suitable intervals, and to these collars are secured a number of cables 68 which converge toward the point of suspension 69, which is preferably a small carriage 70 arranged to travel along a horizontal track 71 provided by a suitable transverse crane 72. This crane preferably extends to either side of the vertical support, and is pivoted at its middle to a standard 73 which rises from the top of the vertical frame, and such standard at its top has a pivoted cap 74 from which radiate a number of tension cables 75 extending into attachment with suitable portions of the horizontal part of the crane. The weight of the conveyer tube may be equalized by means of a stay 76 fixed to the outer end of the horizontal crane and extending to a suitable traveler 77 guided by a segmental track 78, as will be readily understood from Figs. 2 and 15.

For the purpose of positioning and steadying the boat during the dredging, this invention provides the boat with means for inserting and removing one or more piles or like anchoring means about which the boat may be oscillated so as to cause the excavating chain to swing back and forth and to progressively remove arc-shaped portions of the bank.

Turning to Figs. 1 and 3, it will be seen that the boat carries two small derricks 79 and 80. These derricks are preferably spaced apart on each side of the center line of the boat, and they may be located at any portion of the boat, either at or intermediate the ends thereof, as shown by the said figures. Underlying the apex or sheave 81 of each derrick is a tubular well 82 through which the associated pile 83 may have a vertical movement, and preferably each well is of a sufficient length to prevent an oscillation in a vertical plane of the contained pile. A rope 84 will pass from the upper end of the pile over the sheave and thence to any suitable hoisting mechanism. In lieu of these derricks any other suitable means for raising or lowering the piles may be resorted to within the scope of this invention. It will now be understood that the boat may be oscillated about either one of these piles, thereby causing the prow or cutting portion thereof to describe an arc and remove a corresponding layer of the embankment in advance of the boat. As soon as the boat has described an arc of the desired length and reached the turning point, which will be on that side containing the embedded pile which acts as a pivot, the more distant pile may be embedded and the first mentioned pile then withdrawn. Upon returning the boat about the newly embedded pile, it will be seen that another arc-shaped layer will be removed from the embankment in advance of the boat, and the latter will at the same time progress slightly, depending upon the distance between the two piles. Thus through the alternative employment of each of these piles, the boat will be caused to progressively advance step by step and at the same time remove any desired width of the embankment ahead of the boat. The advance of the excavator may also be brought about by hawsers affixed to the banks, and other means for the same purpose may be resorted to if desired.

It will thus be seen, without further elaboration, that the disclosed invention is one well adapted to attain the ends and objects hereinbefore pointed out. An excavator made in accordance with this invention will be found to be durable and efficient, and capable of being constructed at a cost which, considering the nature of the work it will perform, will be relatively small. In carrying out this invention some parts might be employed without others and the new features thereof may be combined with elements old in the art, although the herein described type is regarded as the preferred one, and as being a substantial improvement over many of such obvious or implied variations or arrangements.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. An excavating apparatus comprising in combination a plurality of trusses hinged together to form a collapsible polygonal framework, one of said trusses being stationary, and an endless train of excavating buckets mounted to travel around said framework.

2. An excavating apparatus comprising in combination a collapsible framework comprising a plurality of hinged trusses, one of said trusses being immovable and providing at each end a fixed pivot about which another of said trusses may swing, and an endless train of excavating buckets mounted to travel around said framework.

3. An excavating apparatus comprising in combination a stationary derrick, a pair of depending trusses pivoted at the upper and lower ends of said derrick respectively, an inextensible link hinged to and connecting the free ends of said trusses, and an endless excavating chain mounted to travel around the periphery of the aforesaid parts.

4. An excavating apparatus comprising in combination a plurality of trusses hinged at adjacent ends to form a collapsible polygonal framework, one of said trusses being immovable and forming a stationary derrick and extending upwardly, and an endless excavating chain mounted to travel around said framework and discharge debris near the summit thereof.

5. An excavating apparatus comprising in combination a plurality of trusses hinged at adjacent ends to form a collapsible polygonal framework, one of said trusses being stationary and slanting upwardly and terminating to form a fixed apex about which a companion truss may swing, and an excavating chain mounted to travel around said framework.

6. An excavating apparatus comprising in combination a plurality of trusses hinged together at their adjacent ends to form a collapsible polygonal framework, the apex and foot of one of said trusses being fixed in position and adapted to serve as pivots about which companion trusses may swing to raise or lower the toe of said framework, and an endless train of excavating buckets mounted to travel around said framework.

7. An excavating apparatus comprising in combination a float, a stationary derrick carried thereby, a truss pivoted to swing from the apex of said derrick, depending trusses hinged to the lower portions of said swinging truss and said derrick respectively and converging to form a toe, and an endless chain of buckets mounted to travel around the aforesaid framework, whereby upon swinging said swinging truss the toe of said framework may be raised or lowered to excavate at different depths.

8. A collapsible polygonal framework comprising two upper trusses converging toward a fixed apex, one of said trusses being immovable and the other being adapted to swing about said apex, a segmental track supporting the lower end of said swinging truss, and a pair of depending trusses converging toward a hinged toe, the one being hinged and depending from said swinging truss and the other from said immovable upper truss.

9. A collapsible polygonal framework comprising a pair of upper trusses converging toward a fixed apex, and a pair of lower depending trusses converging toward a movable toe, one of said upper trusses being hinged to swing about said apex and the other being immovable, a segmental track arranged to carry the lower end of said swinging truss, and a train of excavating buckets mounted to travel around said framework to gather material at the bottom thereof and discharge the same at the fixed apex.

10. An excavating apparatus comprising in combination a float, a collapsible polygonal framework mounted on said float at one end thereof and with the lower portion of said framework submerged, means for expanding or collapsing said framework to raise or lower the toe thereof, and an excavating means arranged to remove debris from a point adjacent said toe and discharge the same at a point overlying said float.

11. An excavating apparatus comprising in combination a vehicle, a collapsible polygonal framework carried by said vehicle on the bow thereof, said framework providing a fixed point of discharge, and an endless excavating belt mounted to travel around said framework and discharge debris at said point.

12. An excavating apparatus comprising in combination a boat, a collapsible polygonal framework carried by said boat on the bow thereof and composed of a plurality of inextensible hinged links or trusses forming the sides of the polygonal framework, one of said trusses rising from the beak of said boat, whereby said framework may be collapsed or expanded without varying the length of its periphery, and an endless excavating chain mounted to travel around said constant periphery.

13. An excavating apparatus comprising in combination a vehicle, a plurality of trusses supported by said vehicle and converging upwardly to form an apex, one of said trusses being adapted to swing about said apex as a center and another being immovable and rising from the extreme end of said vehicle, and an endless excavating belt mounted to travel along said trusses.

14. An excavating apparatus comprising in combination a vehicle, a plurality of trusses carried thereby, one of said trusses rising from the extreme end of said vehicle and converging upwardly with another toward an apex, said apex being fixed in position relatively to said vehicle and one of said trusses being adapted to swing about said apex as a center, and an endless excavating belt guided in its travel by said trusses.

15. An excavating apparatus comprising in combination a vehicle, a plurality of trusses carried thereby, one of said trusses rising from the extreme end of said vehicle and converging upwardly with another to form an apex, one of said trusses being arranged to swing about said apex as a center, a segmental track carried by said vehicle and supporting the lower ends of said swinging truss, and an endless excavating chain mounted to travel around the periphery of said trusses.

16. An excavating apparatus comprising in combination a vehicle provided with a well coinciding with the longitudinal center and located in the forward end of said vehicle, a collapsible polygonal framework arranged partly in said well and having portions extending above and below said well, said framework comprising two links hinged together, said hinge being adapted to be displaced into different positions relative to said vehicle, whereby the collecting portions of an excavating means may be raised or lowered, and an endless excavating means mounted to travel around the periphery of said framework.

17. An excavating apparatus comprising in combination a vehicle, a pair of trusses converging upwardly to form an apex, one of said trusses being hinged at said apex and adapted to swing thereabout, a track carried by said vehicle upon which the lower end of said swinging truss is supported, a pair of depending converging trusses, the one being hinged to the lower end of said swinging truss and the other to said vehicle, and an excavating means adapted to be guided in its travel by said trusses and arranged to discharge material in proximity with the apex.

18. An excavating apparatus comprising in combination a vehicle, a pair of trusses carried thereby and converging to form an upper hinged joint about which one of said trusses may swing, a segmental track arranged to support the lower end of said swinging truss, said track having a curvature inscribed by the bearing end of the swinging truss, a pair of swinging trusses hinged together at their lower ends to form a toe, the one truss being hinged to the forward end of said vehicle and the other to the free end of said swinging truss, and an excavating means mounted to travel around said trusses and discharge material adjacent the upper hinged joint thereof.

19. An excavating apparatus comprising in combination a vehicle, a stationary framework carried thereby and rising from the extreme end thereof, a collapsible framework comprising a truss pivotally swung from an upper fixed pivot provided by said stationary framework, and an endless excavating chain mounted to travel around the periphery of said framework and discharge material adjacent said upper pivot.

20. An excavating apparatus comprising in combination a vehicle, a stationary framework rising from the extreme end thereof, a swinging truss converging toward the summit of said stationary framework and pivoted thereto, the lower ends of said swinging truss and said stationary framework being connected by a plurality of hinged trusses arranged to provide a lower toe, whereby upon swinging the lower end of said swinging truss said toe may be raised, and a train of excavating buckets mounted to travel around said framework.

21. An excavating apparatus comprising in combination a vehicle provided with an elongated well in its forward end, a segmental track rising at each side of said well, the radii of said tracks centering at a point overlying said well and to the rear of the extreme end of said vehicle, a swinging truss having a lower end arranged to travel upon each track, a truss hinged to and depending from the lower end of said upper trusses, a companion truss hinged to the end of said vehicle, said depending trusses converging to form a hinged toe which may be raised by moving the lower end of said swinging truss, and an endless train of excavating buckets mounted to travel around the periphery of said trusses.

22. An excavating apparatus comprising in combination a vehicle, a collapsible diamond-shaped framework carried thereby, one of the intermediate joints of said framework being adjustably mounted on said vehicle and the other affixed to the end thereof, whereby the former may be moved relative to the latter to raise or lower the toe of said framework, and an endless excavating chain mounted to travel around the periphery of said framework.

23. An excavating apparatus comprising in combination a vehicle, a plurality of trusses hinged to form a collapsible diamond-shaped framework, a curvilinear track carried by said vehicle and arranged to support one of the intermediate hinges of said collapsible framework, the other being affixed to the extreme end of said vehicle, whereby the former may be retreated to raise its toe, and an endless excavating chain mounted to travel around said framework.

24. An excavating apparatus comprising in combination a vehicle, a plurality of trusses hinged at meeting ends to form a diamond-shaped collapsible framework, a segmental track whose center of curvature is the apex of said framework, the rearward intermediate joint of the latter being arranged to travel along said track to raise or lower the toe of said framework, the forward intermediate joint being affixed to said vehicle, and a train of excavating buckets mounted to travel around the periphery of said framework.

25. An excavating apparatus comprising in combination a boat, a collapsible polygonal framework arranged to coincide with the longitudinal axis and carried by the bow of said boat, the upper end of said framework being fixed and serving as a pivot about which one of the depending members of said framework may be swung, the other depending member constituting a stationary framework carried by said vehicle and serving as a support for said upper pivot, said stationary framework rising from the beak of said boat.

26. In excavating apparatus, in combination, an excavating bucket comprising a body portion having a wall provided with a cutting edge, and a swinging discharge door hinged to said body portion and located opposite said wall, a runway causing said bucket to travel in a predetermined path, and an auxiliary runway for holding said door closed during the major portion of the travel of said bucket and permitting said door to open at a predetermined station.

27. An excavating apparatus comprising, in combination, a frame work, and an endless excavator mounted to travel around said frame work, said excavator comprising a series of buckets, one of the walls of each of said buckets being provided with an extension whereby said bucket is pivotally connected to the succeeding bucket.

28. An excavating apparatus comprising, in combination, a frame work, and an endless excavator mounted to travel around said frame work, said excavator comprising a series of buckets, the side walls of each of said buckets being provided with extensions whereby said bucket is pivotally connected to the succeeding bucket.

29. In excavating apparatus, in combination, an excavating bucket comprising a body portion having a wall provided with a cutting edge, a discharge door opposite said wall, said door being hinged to said body portion of the bucket at its lower end, a runway causing said bucket to travel in a predetermined path, and an auxiliary runway for holding said door closed during the major portion of the travel of said bucket and permitting said door to open at a predetermined station.

30. An excavating apparatus comprising in combination a collapsible framework comprised of a plurality of hinged trusses, one of said hinges consisting of an apertured block affixed to one of said trusses and providing a bearing serving as a pivot for the companion truss, and a shaft revolubly mounted within the aperture of said block.

31. An excavating apparatus comprising in combination a collapsible framework, a chain adapted to travel around said framework, a bucket carried by said chain, the side of said bucket adjacent said chain being provided with a hinged door adapted to be opened to discharge the contents of said bucket, and a runway maintaining closed said door while said bucket is conveying material to the discharge point.

32. An excavating apparatus comprising in combination a collapsible polygonal framework, a chain adapted to travel around said framework, buckets carried by said chain and radiating from said framework, and a hinged door on the side of each bucket adjacent said chain, whereby the contents of said bucket may be discharged at a predetermined station.

33. An excavating apparatus comprising in combination a vehicle, a collapsible polygonal framework having at each joint thereof a turning wheel, an endless chain mounted to travel around said wheels, one of said wheels being adapted to drive said chain, excavating buckets carried thereby, and means for discharging the contents of each bucket at a point fixed relatively to said vehicle, a chute for receiving and conveying the contents of said buckets, and an overlying crane for carrying said chain, whereby it may be freely moved into diverse positions to deliver said contents at any predetermined point.

34. An excavating apparatus comprising in combination a jointed runway, turning wheels at each joint thereof, an endless series of connected excavating buckets, an endless chain also attached to said connected buckets and carried by said wheels, and means for driving said chain to propel said connected buckets.

35. An excavating apparatus comprising, in combination, a traveling chain, certain of the links of said chain being spread intermediate their ends, a bearing block seated in the crotch formed by the ends of each of said links and adapted to be disengaged by moving it toward the spread portion of said link, and an excavating bucket secured to each block.

In testimony whereof I affix my signature, in the presence of two witnesses.

THOMAS F. LONNEY.

Witnesses:
 ARTHUR G. PREVIN,
 H. M. SEAMANS.